United States Patent
Sherman

[11] Patent Number: 5,389,254
[45] Date of Patent: Feb. 14, 1995

[54] WATER TREATMENT SYSTEM

[75] Inventor: Lawrence C. Sherman, Clearwater, Fla.

[73] Assignee: Olin Corporation, St. Petersburg, Fla.

[21] Appl. No.: 106,253

[22] Filed: Aug. 13, 1993

[51] Int. Cl.$^6$ ............................................. B01D 63/00
[52] U.S. Cl. ................... 210/257.2; 210/89; 210/138; 210/263; 210/416.1
[58] Field of Search ............... 210/652, 195.2, 195.1, 210/668, 669, 651, 650, 900, 638, 138, 97, 416.1, 236, 257.2, 97, 263, 89; 250/430; 137/206; 227/23; 422/186

[56] References Cited
U.S. PATENT DOCUMENTS

| | | | |
|---|---|---|---|
| 3,664,365 | 3/1972 | Ralet et al. | 137/206 |
| 3,695,296 | 10/1972 | Smith | 138/30 |
| 3,870,033 | 3/1975 | Faylor et al. | 210/900 |
| 4,548,716 | 10/1985 | Boeve | 210/652 |
| 4,787,980 | 1/1988 | Ackermann et al. | 210/652 |
| 4,801,375 | 1/1989 | Padilla | 210/138 |
| 4,990,311 | 2/1991 | Hirai et al. | 422/4 |
| 5,112,477 | 5/1992 | Hamlin | 210/195.2 |
| 5,118,422 | 6/1992 | Cooper et al. | 210/236 |
| 5,147,532 | 9/1992 | Leek, Jr. | 210/97 |
| 5,151,174 | 9/1992 | Wiesmann | 210/97 |
| 5,282,967 | 2/1994 | Tatsuno et al. | 210/652 |
| 5,302,356 | 4/1994 | Shadman et al. | 210/900 |

Primary Examiner—Robert A. Dawson
Assistant Examiner—Ana M. Fortuna
Attorney, Agent, or Firm—Gregory S. Rosenblatt

[57] ABSTRACT

A method system for treating water in which the incoming effluent water is pre-filtered, passed through a reverse osmosis unit, post filtered to remove taste and odor and then passed to a holding tank. The holding tank is provided with a source of ultraviolet light to provide disinfection in the holding tank to eliminate bacterial growth prior to consumption of the water therein.

8 Claims, 1 Drawing Sheet

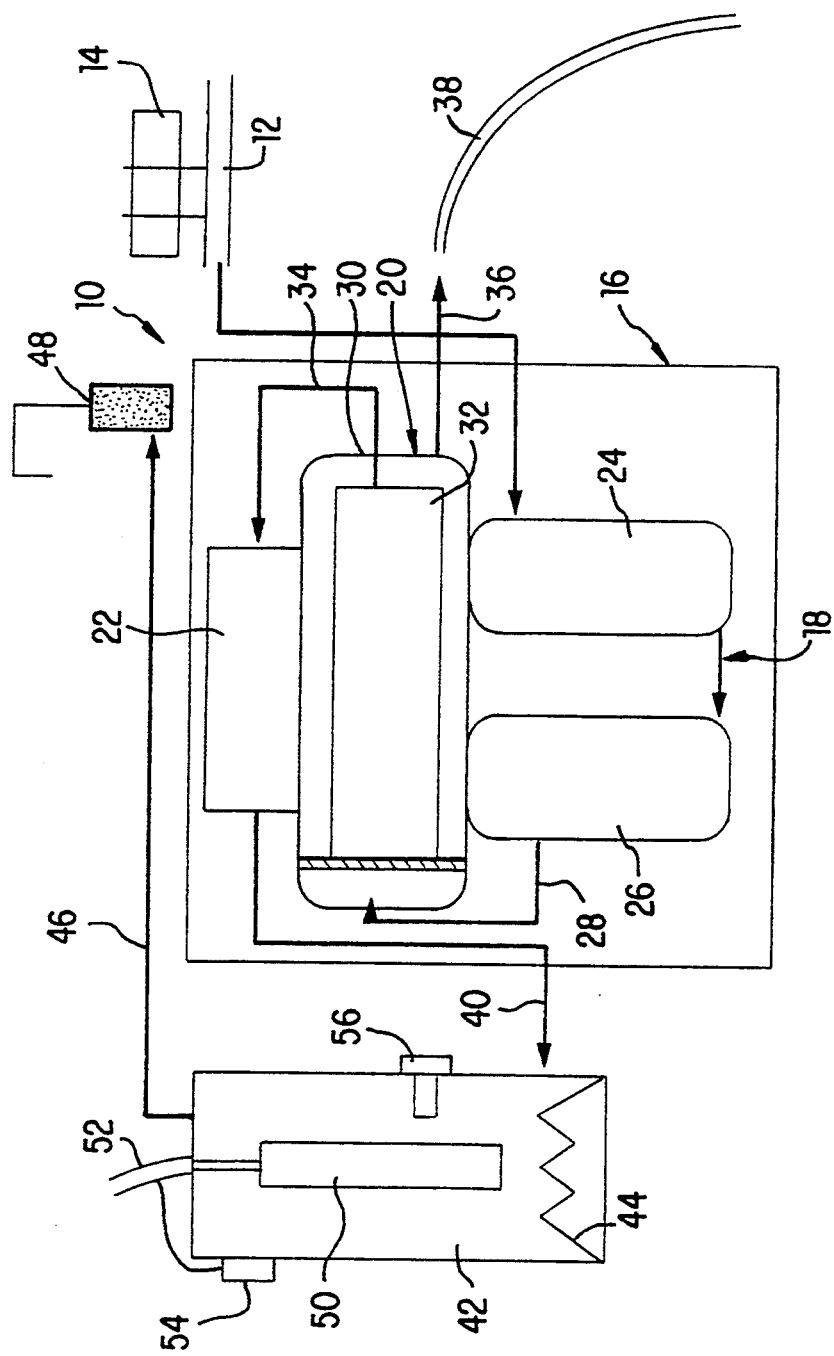

5,389,254

WATER TREATMENT SYSTEM

BACKGROUND OF THE INVENTION

This invention relates generally to a water treating system. More particularly, this invention relates to a water treatment system for purifying drinking water and which has particular application at the point of use.

In many instances, existing water supplies do not meet potable water standards. This is particularly true in many third world nations wherein the existing potable water supplies do not meet the potable water standards set by the World Health Organization.

In those cases where drinking water which meets the applicable standards is not available, many users purchase bottled water at premium prices to satisfy their need for safe potable water. However, such bottled water is relatively expensive and many individuals and families cannot afford the cost of obtaining water at such prices.

Accordingly, there is a need for a relatively inexpensive, compact water treating system for potable water, particularly one that can be installed at the point of use, for example in a home.

SUMMARY OF THE INVENTION

In view of the above, it is an object of the present invention to provide an improved water treating system.

More specifically, it is an object of the present invention to provide an improved water treating system for potable water for point of use applications.

A still more specific object of the present invention is to provide a relatively compact, potable water treating system for point of use applications.

These and other objects are advantages of the present invention and may be be achieved through the provision of a water treating system which includes pre-filter means for filtering influent water. Reverse osmosis means is provided for removing ionic levels of contaminants from the pre-filtered water. A holding tank is provided for receiving the water from the reverse osmosis means. An ultraviolet light source is mounted in the holding tank for providing ultraviolet disinfection for the water contained in the holding tank.

The method for treating water in accordance with the present invention comprises pre-filtering the water, passing the pre-filtered water through a reverse osmosis unit to remove ionic contaminants, bacteria, virus and salt, and passing the treated water from the reverse osmosis unit to a holding tank. The process further comprises subjecting the water in the holding tank to ultraviolet light to provide ultraviolet disinfection.

DESCRIPTION OF THE DRAWINGS

A better understanding of the invention may be had by reference to the following detailed description and to the accompanying drawing in which:

The FIGURE of the drawing shows a schematic diagram of a water treating system constructed in accordance with the present invention.

DETAILED DESCRIPTION

Referring to the drawing, which shows a schematic diagram of the system of the present invention, the influent water enters the system 10 under line pressure through a suitable infeed line 12 which may have an appropriate shutoff valve 14 therein. The source of such influent may be a municipal water supply or well where the water is supplied to the user isolator under pressure. Preferably, the pressure of the influent water entering the system 10 should be between about 40 to about 100 pounds per square inch (psi).

The system includes an enclosure 16 which houses a pre-filter means 18, a reverse osmosis unit 20 and a post filter 22. The influent water passes to the pre-filteration means 18 through the line 12. The pre-filtration means 18 may include two pre-filters 24 and 26. The first, or upstream, pre-filter 24 is of the type which will filter out 25 micron or larger solid contaminants. The second, or downstream, pre-filter 26 is of a type that will filter out solid particles down to a size of 5 micron or less. The pre-filters 24 and 26 may each be of the cartridge type, about 10 inches long. Although two cartridge type pre-filters have been shown, other arrangements of pre-filtration may be used so long as a 5 micron filtered influent enters the reverse osmosis unit 20. For example, the pre-filter means 18 may utilize sediment filters.

The pre-filtered water passes from the pre-filter means 18 through a line 28 within the enclosure 16 to the reverse osmosis unit 20. The reverse osmosis unit 20 may include a housing 30 in which is mounted a membrane element 32 through which the water passes. In reverse osmosis, the pressure of the incoming solution is greater than the osmotic pressure so that fresh water diffuses through the membrane in the opposite direction to normal osmotic flow. The membrane element be 32 may of a conventional type and may utilize spiral membrane elements as is well know in the art. A wide variety of materials are used for the membrane including polyamides, polyimides, as well as cellulose acetate. Alternatively, the membrane unit may also be of a tubular construction, also well known in the art. The membrane element 32, including the type of membrane used therein, may be of various types so long as an ionic level of contaminants are removed as well as bacteria, virus and salt.

The effluent, or treated water, from the reverse osmosis unit 20 is passed to the post-filter 22 by means of a line 34 within the enclosure 16. The post-filter is preferably a ten inch granulated carbon filter. The post filter 32 serves to remove any residual taste and odor which may be present in the water. The reject water passes from the reverse osmosis unit 20 through a line 36 which extends out from the enclousre 16 and which may be connected to a suitable drain 38.

The pre-filter means 18, the reverse osmosis unit 20 and the post-filter 22 are commercially available as a packaged units within a suitable enclosure. For example, one such unit which is suitable for the present system is produced by Alamo Water Refiners of San Antonio, Tex.

The treated water exits the enclosure 16 through a line 40 extending from the post-filter 22 within the enclosure 16. The treated water enters a holding tank 42 to which the other end of the line 40 is connected. The tank 42 is designed to hold between about 3 to about 5 gallons of treated water. The holding tank 42 is provided with a diaphragm 44 at its bottom which provides pressure within the tank 42. This pressure serves to force the treated water from the holding tank 42 through a line 46 to a tap or faucet 48 from which the water may be dispensed upon operation by a user in the usual manner. The diaphagm may be of a rubber material such as butyl rubber.

An ultraviolet light source 50, connected to an appropriate source of electricity by means of electrical connector 52, is mounted within the holding tank 42 above the diaphragm 44. The ultraviolet source may be an elongated ultra violet lamp which is mounted so that its axis of elongation is perpendicular to the diaphragm. This prevents direct wave length interaction from the ultraviolet source with the diaphragm which could result in degradation of the diaphragm. The ultraviolet source should be sufficient to provide ultraviolet disinfection of the water within the holding tank 42 to eliminate bacterial growth prior to the consumption of the potable water. By way of an example, the ultraviolet source may be a ten inch, quartz jacketed, ¾ inch, 254 nanometers (NM), 30,000 microwatts/cm$^2$/second lamp. Standard, commercially available lamps, may be used for this purpose. One such ultraviolet source meeting the above specifications is manufactured by Ideal Horizons of Rutland, Vt. The lamp is connected through the electrical connector 52 to an appropriate power source which will depend upon the normal usage in the country or location where the system is being utilized.

The system may also include a timer 54, which may be analog or digital, to provide a visual indication of the length of time that the ultravioilet light source 50 has been in operation. The timer 54 may be electrically connected the electrical source going to the ultravioilet light source 50. Additionally, an ultraviolet light sensor 56 may be mounted in the holding tank 42 to measure the ultraviolet intensity. The sensor 56 may preferably be a photocell provided with a digital or analog readout.

In operation, with the valve 14 open, the influent enters the treating system within the enclosure 6 through line 12 and passes to the pre-filter means 18. The pre-filter means 18 filters out the solid contaminants down to five microns. The pre-filtered water then passes through line 24 into the reverse osmosis housing 30 and passes through the membrane element 22. The purified water passes from the reverse osmosis unit 20 through the post-filter 22 while the reject water is discharged to the drain 38 through the line 36.

The effluent then passes from the carbon filter post-filter 22 which serves to remove objectionable taste and odor to the holding tank 44 in which the water is held until used. The ultra-violet lamp 50 within the tank 42 provides an ongoing disinfectant preventing the holding tank from being a source of biological contamination. The water within the holding tank 52 is maintained under pressure by the diaphragm 46 so that when a user wishes to obtain potable water, the faucet 48 may be actuated whereupon purified water will pass from the holding tank 42 through line 48 and out of the faucet 48.

By way of specific example, a system designed to provide 12 gallons per day of purified water with a 25% recovery rate may use two pre-filters, the first being a 25 micron-10 inch sediment filter with the second being in a 5 micron-10 inch sediment filter. The post filter may be a 10 inch granulated carbon type filter. The reverse osmosis unit may utilize a spiral wound, polyacetate membrane. A unit enclosing the pre-filtration means 18, reverse osmosis unit 20 and post-filter 22 may measure about 17" high by 14" wide by 5½" deep and weigh about 26 pounds.

The system is designed to operate under an infeed water pressure of from about 40 psi to 100 psi at a temperature of from about 40° to about 80° F. Ideally, the feed water pH should between about 4 to about 9. The holding tank may be designed to hold 3.2 gallons and may be outfitted with an ultra violet source and diaphragm as described above. With a system of this type the ultra violet light source will be operated 24 hours a day.

With the above described system, an effective and compact system is provided to produce potable water at a point of use of location. The system purifies the influent and stores it under conditions to insure disinfection until ready to use.

While reference has been made above to a specific embodiment of the invention, it is apparent that many changes, modifications and variations can be made without departing from the inventive concept disclosed. Accordingly, it is intended to embrace all such changes, modifications and variations that fall within the spirit and broad scope of the appended claims.

What is claimed is:

1. A system for treating water comprising:
   (a) a pre-filter for filtering influent water,
   (b) a reverse osmosis membrane for removing ionic level contaminants from the pre-filtered water,
   (c) a holding tank for receiving water from said reverse osmosis membrane,
   (d) a source of ultraviolet light within said holding tank for providing sufficient ultraviolet disinfection to eliminate bacterial growth in the water contained therein, wherein said holding tank maintains the water contained therein under pressure by means of a pressure maintaining diaphragm mounted within said tank, and
   (e) an outlet from said holding tank for dispensing potable water.

2. The system of claim 1 further including a post-filter positioned between the reverse osmosis unit and the holding tank for filtering the odor and taste of the water emminating from the membrane unit.

3. The system of claim 2 wherein said post-filter is a granulated carbon filter.

4. The system of claim 2 wherein said ultraviolet light source comprises an elongated ultraviolet light mounted within said holding tank, said ultraviolet light having its axis of elongation extending perpendicular to the diaphragm.

5. The system of claim 1 wherein said pre-filter comprises a plurality of pre-filters positioned upstream of said reverse osmosis membrane.

6. The system of claim 1 further including a line connecting said reverse osmosis membrane to a drain to provide for removal of reject water.

7. The system of claim 1 futher including a timer means for indicating the length of time the source of ultraviolet light source is in operation.

8. The system of claim 1 futher including an ultraviolet light sensor mounted in said holding tank.

* * * * *